(12) United States Patent
Hinami et al.

(10) Patent No.: US 9,914,186 B2
(45) Date of Patent: Mar. 13, 2018

(54) WATER JET PEENING DEVICE

(71) Applicant: MITSUBISHI HEAVY INDUSTRIES, LTD., Tokyo (JP)

(72) Inventors: Kazuyuki Hinami, Tokyo (JP); Kenichi Kawanishi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/652,531

(22) PCT Filed: Jan. 9, 2014

(86) PCT No.: PCT/JP2014/050259
§ 371 (c)(1),
(2) Date: Jun. 16, 2015

(87) PCT Pub. No.: WO2014/115585
PCT Pub. Date: Jul. 31, 2014

(65) Prior Publication Data
US 2015/0321299 A1   Nov. 12, 2015

(30) Foreign Application Priority Data

Jan. 28, 2013 (JP) .................................. 2013-013610

(51) Int. Cl.
*B23P 17/00* (2006.01)
*B05B 13/06* (2006.01)
(Continued)

(52) U.S. Cl.
CPC .......... *B23P 17/00* (2013.01); *B05B 13/0672* (2013.01); *B24C 1/003* (2013.01);
(Continued)

(58) Field of Classification Search
CPC ....... B05B 12/14; B05B 13/00–13/069; B05B 15/065–15/10; B05B 13/0672;
(Continued)

(56) References Cited

U.S. PATENT DOCUMENTS 1,760,165 A * 5/1930 Mueller .............. B05B 13/0672
                                                    118/318
2,232,807 A * 2/1941 Scott ................... B05B 13/0415
                                                    118/308
(Continued)

FOREIGN PATENT DOCUMENTS

JP       6-114735 A     4/1994
JP       7-210590 A     10/1995
(Continued)

OTHER PUBLICATIONS

Translation of Written Opinion dated Mar. 18, 2014, issued in counterpart International Application No. PCT/JP2014/050259 (4 pages).
(Continued)

*Primary Examiner* — R. K. Arundale
*Assistant Examiner* — Joseph Finan, Jr.
(74) *Attorney, Agent, or Firm* — Westerman, Hattori, Daniels & Adrian, LLP (57) ABSTRACT

The water jet peening device of the present invention is provided with: a swiveling mechanism for swiveling a spray nozzle in the horizontal direction centered on a positioning member that is positioned at the upper end of an instrumentation tube support; a lift mechanism for raising and lowering the spray nozzle in the vertical direction with respect to the positioning member that is positioned at the upper end of the instrumentation tube support; and a rotation mechanism for supporting the spray nozzle so as to be able to rotate centered on a downward-inclined rotation shaft center on the positioning member end of the vertical direction, disposing a spray port aimed toward the side of the rotation shaft center in a direction that is at a slant from the rotation shaft center, and rotating the spray nozzle centered on the rotation shaft center.

3 Claims, 9 Drawing Sheets

(51) Int. Cl.
- *B24C 1/00* (2006.01)
- *B24C 1/10* (2006.01)
- *C21D 10/00* (2006.01)
- *G21C 17/01* (2006.01)
- *G21C 17/017* (2006.01)
- *G21C 19/20* (2006.01)
- *C21D 7/04* (2006.01)

(52) U.S. Cl.
CPC ............... *B24C 1/10* (2013.01); *C21D 10/00* (2013.01); *G21C 17/01* (2013.01); *G21C 17/017* (2013.01); *G21C 19/207* (2013.01); *B05B 13/0636* (2013.01); *B05B 13/0654* (2013.01); *C21D 7/04* (2013.01)

(58) Field of Classification Search
CPC . B23P 17/00; B24C 1/10; B24C 1/003; C21D 10/00; C21D 7/04; G21C 17/01; G21C 17/017; G21C 19/207
USPC .............................................. 72/53; 29/81.06
See application file for complete search history.

(56) References Cited

U.S. PATENT DOCUMENTS

| | | | | |
|---|---|---|---|---|
| 3,027,095 A * | 3/1962 | Paasche | ............. | B05B 13/0415 118/323 |
| 3,874,594 A * | 4/1975 | Hatley | ............. | B05B 3/16 134/167 R |
| 4,515,312 A * | 5/1985 | Manabe | ............. | B08B 9/0933 239/227 |
| 5,749,384 A * | 5/1998 | Hayashi | ............. | B08B 9/023 134/167 R |
| 6,058,153 A * | 5/2000 | Kurosawa | ............. | G21C 19/00 376/245 |
| 8,181,890 B2 * | 5/2012 | Zilai | ............. | B08B 9/0936 134/167 R |
| 2003/0052189 A1 * | 3/2003 | Kronz | ............. | B05B 15/08 239/227 |
| 2009/0029631 A1 * | 1/2009 | Offer | ............. | B24D 13/10 451/28 |
| 2010/0242660 A1 * | 9/2010 | Offer | ............. | B25J 9/06 74/490.05 |

FOREIGN PATENT DOCUMENTS

| | | |
|---|---|---|
| JP | 9-136261 A | 5/1997 |
| JP | 10-10282 A | 1/1998 |
| JP | 2006-201141 A | 8/2006 |
| JP | 2010-276491 A | 12/2010 |

OTHER PUBLICATIONS

International Search Report dated Mar. 18, 2014, issued in corresponding application No. PCT/JP2014/050259 (2 pages).
Written Opinion of the International Searching Authority dated Mar. 18, 2014, issued in corresponding application No. PCT/JP2014/050259 (3 pages).
Decision of a Patent Grant dated Oct. 11, 2016, issued in counterpart Japanese Application No. 2013-013610, with English translation. (3 pages).

* cited by examiner

WATER JET PEENING DEVICE

TECHNICAL FIELD

The present invention relates to a water jet peening device that repairs a tube support provided in a reactor vessel and the periphery of the tube support.

BACKGROUND ART

For example, in a nuclear power plant including a Pressurized Water Reactor (PWR), light water is used as a nuclear reactor coolant and a neutron moderator and becomes high-temperature and high-pressure water that do not boil surrounding the entire reactor core, the high-temperature and high-pressure water is fed to a steam generator, steam is generated by heat exchange, and the steam is fed to a turbine generator to generate electricity.

In the nuclear power plant, it is necessary to examine various structures or the like of the pressurized water reactor at fixed intervals in order to secure sufficient safety and reliability. In addition, when the examination is performed and defects are found, necessary locations related to the defects are repaired. For example, in the pressurized water reactor, a plurality of instrumentation tube supports penetrating a lower head are provided in a reactor vessel main body, and in each instrumentation tube support, a conduit tube is connected to the lower end portion outside the reactor while an in-core instrumentation guide tube is fixed to the upper end portion inside the reactor. In addition, a neutron flux detector capable of measuring a neutron flux is inserted from the instrumentation tube support into a reactor core (fuel assembly) through the in-core instrumentation guide tube by the conduit tube.

An in-core instrumentation tube is fitted so as to be welded to a mounting hole of the reactor vessel main body, and thus, the instrumentation tube support is configured. Accordingly, tensile stress may remain on the in-core instrumentation tube, or the welded section of the in-core instrumentation tube and the periphery of the welded section, and thus, probability of occurrence of stress corrosion cracking due to long-time use becomes higher. Therefore, in the related art, there is a technology of water jet peening that prevents the stress corrosion cracking by improving tensile residual stress of a surface so as to be compression residual stress. In the water jet peening, high-pressure water including cavitation bubbles is sprayed on the surface of a metal member in water, and the tensile residual stress on the surface of the metal member is improved so as to be the compression residual stress. For example, this water jet peening device is disclosed in PTL 1 below.

In the water jet peening device disclosed in PTL 1, a spray nozzle is configured to swivel centered on an instrumentation tube support, to be raised and lowered in a vertical direction (up-down direction) of the instrumentation tube support, to swing in the downward direction or a direction inclined with respect to the instrumentation tube support, and to move in a front-rear direction in which the spray nozzle approaches or moves away from the instrumentation tube support. Accordingly, the water jet peening is performed on the outer circumferential surface of the instrumentation tube support, and the welded section of the instrumentation tube support with respect to the reactor vessel.

CITATION LIST

Patent Literature

PTL 1: Japanese Unexamined Patent Application Publication No. 2006-201141

SUMMARY OF INVENTION

Technical Problem

Since the water jet peening device described in PTL 1 is configured so that the spray nozzle swings in the downward direction or in the direction inclined with respect to the instrumentation tube support, the water jet peening is performed on the outer circumferential surface of the instrumentation tube support and the welded section of the instrumentation tube support with respect to the reactor vessel main body. When the spray nozzle is swung, the position of the jetting port of the spray nozzle is displaced from the center of the instrumentation tube support in the radial direction, the distance between the metal member surface and the jetting port of the spray nozzle is changed, and thus, there is a concern that effects of the water jet peening may be decreased or may not be obtained. Accordingly, in the water jet peening device disclosed in PTL 1, in order to solve this problem, the spray nozzle is configured to move in the front-rear direction.

However, if the number of the movement mechanisms of the spray nozzle is increased, the size of the device is increased. Since the instrumentation tube support is erected on the bottom portion of the reactor vessel main body, if the size of the device is increased, there are concerns that the device may interfere with other instrumentation tube supports adjacent to the instrumentation tube support subjected to the water jet peening, or the device may interfere with a support frame supporting the in-core structure in the reactor vessel main body in the outermost instrumentation tube support, and thus, the increased device size is not preferable. In addition, if the number of the movement mechanisms of the spray nozzle is increased, the controls of the movement mechanisms are multiplied and become complicated, and there are more factors causing failure.

The present invention is to solve the above-described problems, and an object thereof is to provide a water jet peening device capable of performing water jet peening on the outer surface of an instrumentation tube support and the welded section of the instrumentation tube support while preventing increased device size and complexity.

Solution to Problem

In order to solve the above-described problems, there is provided a water jet peening device in which a spray nozzle is provided along with a positioning member positioned at the upper end of an instrumentation tube support, and a water jet is sprayed from a spray port of the spray nozzle, including: a swiveling mechanism that swivels the spray nozzle in a horizontal direction centered on the positioning member positioned at the upper end of the instrumentation tube support; a lift mechanism that raises and lowers the spray nozzle in a vertical direction with respect to the positioning member positioned at the upper end of the instrumentation tube support; and a rotation mechanism that supports the spray nozzle so as to be able to rotate centered on a downward-inclined rotation shaft center on the positioning member side in the vertical direction, disposes the spray port aimed toward the rotation shaft center side in a direction that is inclined with respect to the rotation shaft center, and rotates the spray nozzle centered on the rotation shaft center.

According to the water jet peening device, in the rotation mechanism, the spray nozzle is supported so as to be able to rotate centered on the downward-inclined rotation shaft center on the positioning member side in the vertical direction, the spray port is disposed aimed toward the rotation shaft center side in the direction that is inclined with respect to the rotation shaft center, and the spray nozzle is rotated centered on the rotation shaft center. Accordingly, a state where the spray port is disposed in the direction inclined at a predetermined angle from the vertical direction at the position at which the distance in the horizontal direction from the positioning member side is relatively long, and a state where the spray port is disposed in the vertical direction at the position at which the distance in the horizontal direction from the positioning member side is relatively short are obtained. Accordingly, it is possible to adjust the position in the horizontal direction by the rotation mechanism. As a result, according to the configurations of the swiveling mechanism, the lift mechanism, and the rotation mechanism, it is possible to perform the water jet peening on the outer surface of the instrumentation tube support and the welded section of the instrumentation tube support while preventing an increased size and complexity of the device.

In addition, in the water jet peening device of the present invention, the rotation mechanism may include: a rotation shaft that supports the spray nozzle so as to be able to rotate with respect to a base portion of the rotation shaft; an introduction path that is provided in the inner portion of the base portion and introduces high-pressure water; a communication path that is provided in the inner portion of the rotation shaft and causes the introduction path and the spray port to communicate with each other; and a sealing material that seals a communication portion between the communication path and the introduction path while allowing the rotation of the rotation shaft.

According to the water jet peening device, it is possible to connect a high-pressure water supply tube that supplies the high-pressure water to the introduction path provided in the base portion which is the fixed side, and it is possible to spray the high-pressure water from the spray port while preventing torsion in the high-pressure water supply tube from being generated when the spray nozzle is rotated and preventing the high-pressure water from being leaked outside the rotation shaft by the seal material.

In addition, in the water jet peening device of the present invention, the rotation mechanism may include: a pinion gear that is provided in the spray nozzle centered on the rotation shaft center; a rack gear that meshes with the pinion gear; and a cylinder that slidingly moves the rack gear.

Since the application of the water jet peening is performed in water, if a motor or the like is used in the rotation mechanism, a mechanism or the like having a waterproof function is required, and thus, the increase in the size of the rotation mechanism occurs. Meanwhile, according to the water jet peening device of the present invention, since the rack gear is slidingly moved by the cylinder and the pinion gear is rotated accompanied by the spray nozzle, the waterproof function is not required, and it is possible to prevent the increase in the size of the rotation mechanism.

In addition, the water jet peening device of the present invention may further include restricting means for restricting the rotation of the spray nozzle at both positions at which the direction of the spray port is reversed according to the rotation of the spray nozzle.

According to the water jet peening device, since the restricting means is provided, in the configuration in which the rack gear is slidingly moved by the cylinder and the pinion gear is rotated accompanied by the spray nozzle, there is restriction at both positions at which the direction of the spray port is reversed, and thus, it is possible to move the spray port toward the appropriate position.

Advantageous Effects of Invention

According to the present invention, it is possible to perform water jet peening on the outer surface of an instrumentation tube support and the welded section of the instrumentation tube support while preventing increased device size and complexity.

DESCRIPTION OF EMBODIMENTS

Hereinafter, an embodiment according to the present invention will be described in detail with reference to the drawings. In addition, the present invention is not limited by the embodiment. Moreover, components in the embodiment below include components that can be easily substituted by a person skilled in the art and substantially the same components as the components in the embodiment below.

Figure 1:
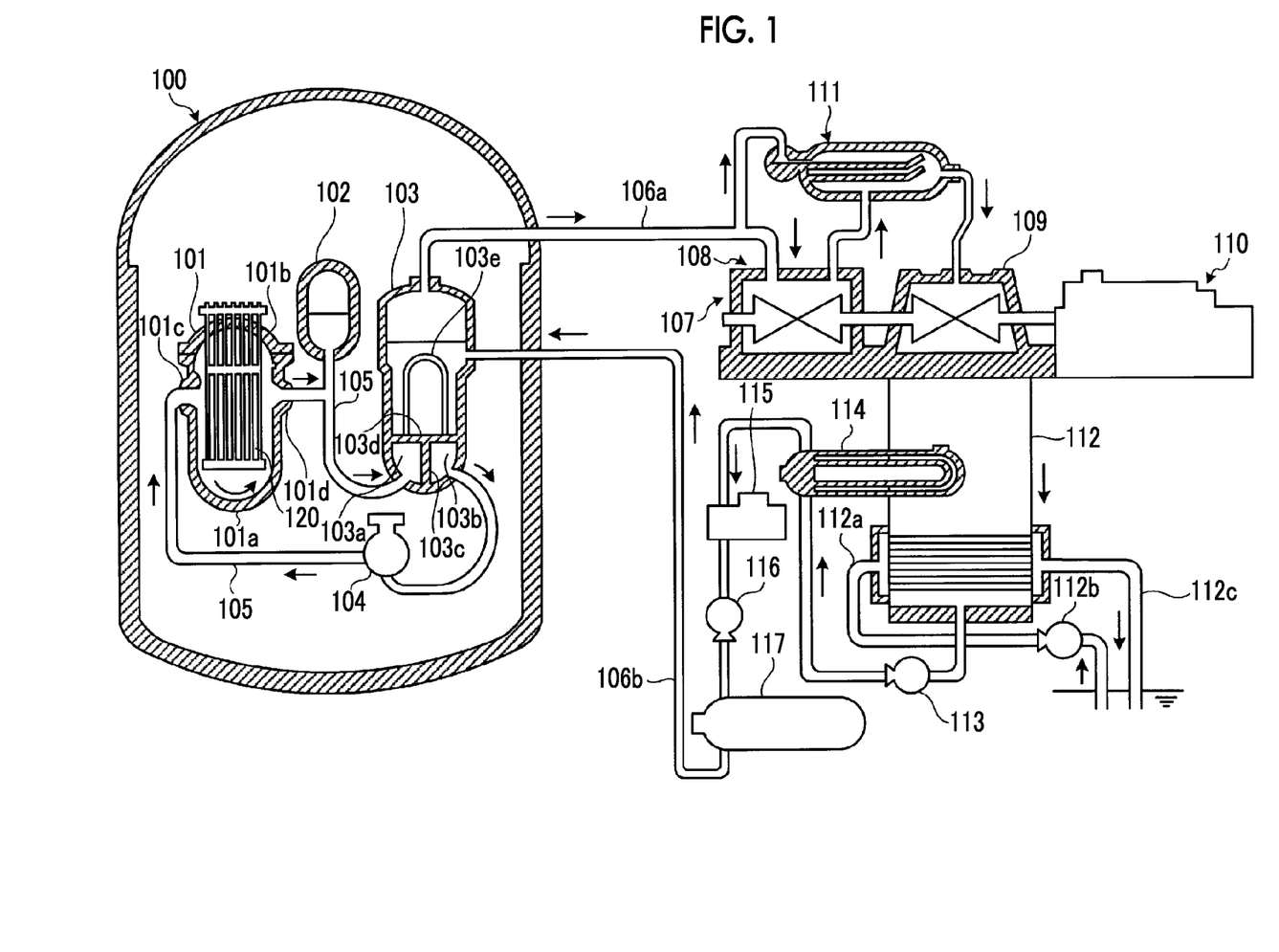
FIG. 1 is a schematic configuration view of an example of a nuclear power plant.
Figure 2:
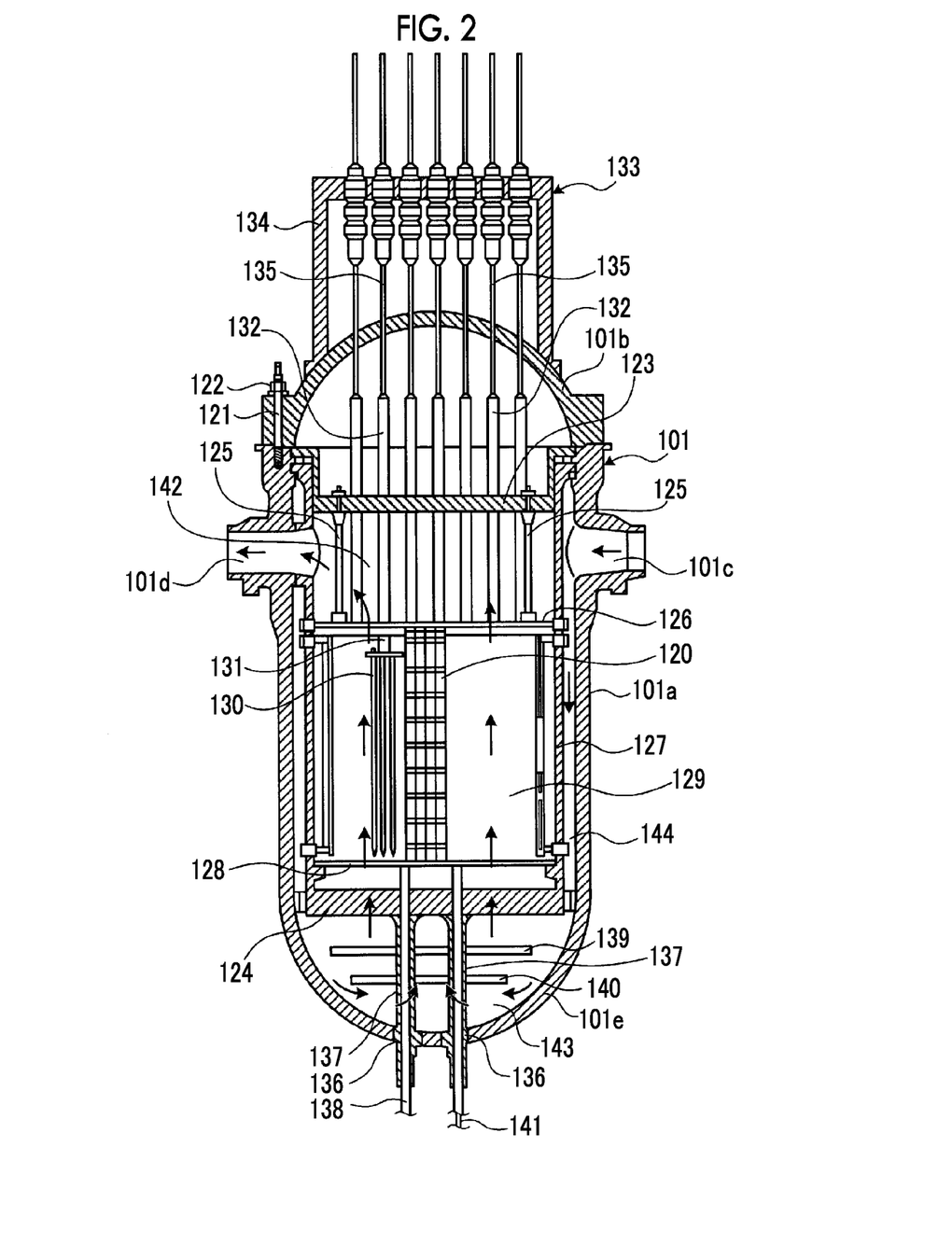
FIG. 2 is a longitudinal cross-sectional view of a pressurized water reactor.
Figure 3:
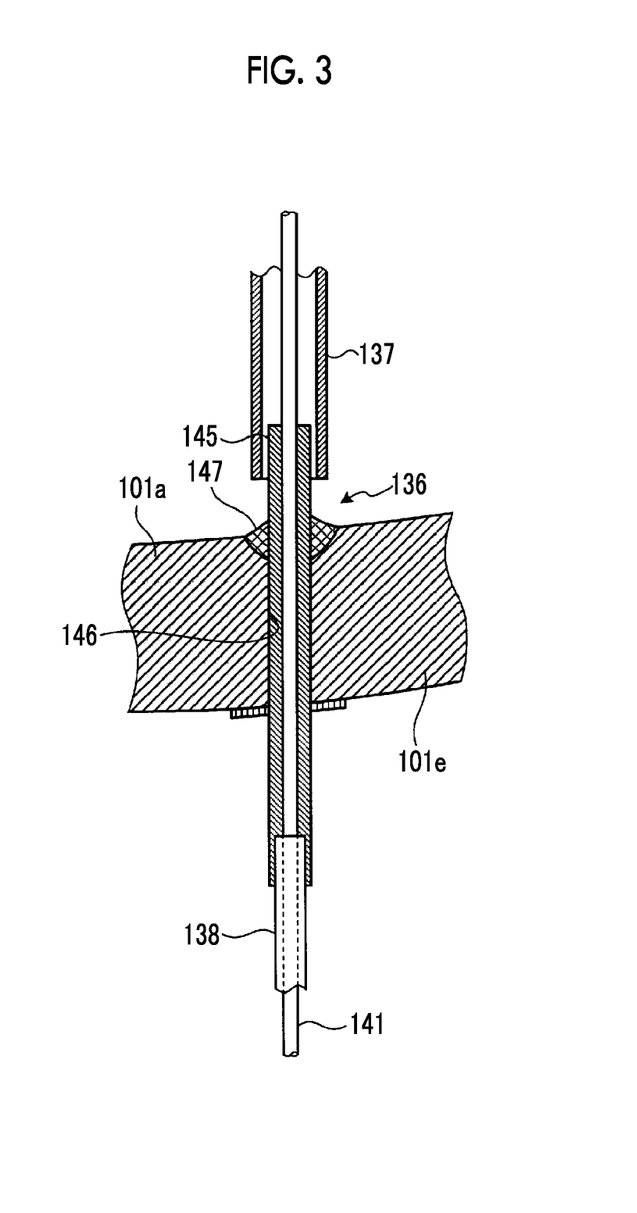
FIG. 3 is a cross-sectional view of an instrumentation tube support of a reactor vessel.

FIG. 1 is a schematic configuration view of an example of a nuclear power plant, FIG. 2 is a longitudinal cross-sectional view of a pressurized water reactor, and FIG. 3 is a cross-sectional view showing an instrumentation tube support of a reactor vessel.

The nuclear power plant shown in FIG. 1 includes a Pressurized Water Reactor (PWR). In the nuclear power plant, a reactor vessel 101, a pressurizer 102, a steam generator 103, and a primary cooling water pump 104 of the pressurized water reactor are sequentially connected by a primary cooling water tube 105 in a reactor container 100, and thus, a circulating path of primary cooling water is configured.

The reactor vessel 101 stores a fuel assembly 120 in the inner portion of the reactor vessel in a sealed state, and includes a reactor vessel main body 101a and a reactor vessel cover 101b mounted on the upper portion of the reactor vessel main body so that the fuel assembly 120 may be inserted and extracted. An inlet side tube support 101c and an outlet side tube support 101d that supply and discharge light water serving as the primary cooling water are provided on the upper portion of the reactor vessel main body 101a. The outlet side tube support 101d is connected to the primary cooling water tube 105 so as to communicate with an inlet side water chamber 103a of the steam generator 103. Moreover, the inlet side tube support 101c is connected to the primary cooling water tube 105 so as to communicate with an outlet side water chamber 103b of the steam generator 103.

In the steam generator 103, in the lower portion which is hemispherically formed, the inlet side water chamber 103a and the outlet side water chamber 103b are provided so as to be partitioned by a partition plate 103c. The inlet side water chamber 103a and the outlet side water chamber 103b are partitioned from the upper portion side of the steam generator 103 by a tube plate 103d that is provided on the top portion. An inverted U-shaped heat transfer tube 103e is provided on the upper portion side of the steam generator 103. End portions of the heat transfer tube 103e are supported by the tube plate 103d so as to connect the inlet side water chamber 103a and the outlet side water chamber 103b to each other. Moreover, the inlet side water chamber 103a is connected to the inlet side primary cooling water tube 105, and the outlet side water chamber 103b is connected to the outlet side primary cooling water tube 105. Moreover, in the steam generator 103, an outlet side secondary cooling water tube 106a is connected to the upper end of the upper portion side partitioned by the tube plate 103d, and an inlet side secondary cooling water tube 106b is connected to the side portion of the upper portion side.

Moreover, in the nuclear power plant, the steam generator 103 is connected to a steam turbine 107 via the secondary cooling water tubes 106a and 106b outside the reactor container 100, and thus, a circulating path of secondary cooling water is configured.

The steam turbine 107 includes a high pressure turbine 108 and a low pressure turbine 109, and a generator 110 is connected to the steam turbine. Moreover, a water separation heater 111 branches from the secondary cooling water tube 106a and is connected to the high pressure turbine 108 and the low pressure turbine 109. In addition, the low pressure turbine 109 is connected to a condenser 112. The condenser 112 is connected to the secondary cooling water tube 106b. As described above, the secondary cooling water tube 106b is connected to the steam generator 103 and reaches the steam generator 103 from the condenser 112, and a condensate pump 113, a low pressure feed water heater 114, a deaerator 115, a main feed pump 116, and a high pressure feed water heater 117 are provided in the secondary cooling water tube.

Accordingly, in the nuclear power plant, the primary cooling water is heated in the reactor vessel 101 to reach a high temperature and a high pressure, is pressurized by the pressurizer 102, and is supplied to the steam generator 103 via the primary cooling water tube 105 while a constant pressure of the primary cooling water is maintained. In the steam generator 103, the secondary cooling water is evaporated by heat exchange between the primary cooling water and the secondary cooling water, and thus, steam is generated. The primary cooling water that is cooled after the heat exchange is recovered to the primary cooling water pump 104 side via the primary cooling water tube 105, and is returned to the reactor vessel 101. Meanwhile, the secondary cooling water becoming steam generated by the heat exchange is supplied to the steam turbine 107. With respect to the steam turbine 107, the water separation heater 111 removes water from the steam exhausted from the high pressure turbine 108, and after the steam is further heated to be overheated, the steam is fed to the low pressure turbine 109. The steam turbine 107 is driven by the steam of the secondary cooling water, the power is transmitted to the generator 110, and thus, electricity is generated. The steam supplied to drive the turbine is discharged to the condenser 112. Heat exchange between cooling water (for example, sea water) fed via an intake tube 112a by a pump 112b and the steam discharged from the low pressure turbine 109 is performed by the condenser 112, and the steam is condensed so as to be returned to a low-pressure saturated liquid. The cooling water used in the heat exchange is discharged from a drain tube 112c. In addition, the condensed saturated liquid becomes the secondary cooling water, and is fed outside the condenser 112 via the secondary cooling water tube 106b by the condensate pump 113. In addition, for example, after the secondary cooling water passing through the secondary cooling water tube 106b is heated by low pressure steam bled from the low pressure turbine 109 at the low pressure feed water heater 114 and impurities of the secondary cooling water such as dissolved oxygen or non-condensable gas (ammonia gas) are removed by the deaerator 115, the secondary cooling water is fed by the main feed pump 116, and for example, after the secondary cooling water is heated by the high pressure steam bled from the high pressure turbine 108 at the high pressure feed water heater 117, the secondary cooling water is returned to the steam generator 103.

In the pressurized water reactor of the nuclear power plant configured as above, as shown in FIG. 2, the reactor vessel cover 101b is fixed to the reactor vessel main body 101a so as to be openable and closable by a plurality of stud bolts 121 and nuts 122 so that the in-core structure including the fuel assembly 120 may be inserted into the inner portion of the reactor vessel 101.

The reactor vessel main body 101a is formed in a cylindrical shape in which the upper portion can be opened by removing the reactor vessel cover 101b, and the lower portion is closed by a lower head 101e having a hemispherical shape. In the reactor vessel main body 101a, an upper reactor core support plate 123 is fixed to the inner portion of the reactor vessel main body 101a above the inlet side tube support 101c and the outlet side tube support 101d, and a lower reactor core support plate 124 is positioned in the vicinity of the lower head 101e positioned at the lower portion is fixed to the inner portion of the reactor vessel main body 101a. The upper reactor core support plate 123 and the lower reactor core support plate 124 are formed in disk shapes, and a plurality of communication holes (not shown) are formed on the plates 123 and 124. Moreover, the upper reactor core support plate 123 is connected to an upper reactor core plate 126, on which a plurality of communication holes (not shown) are formed, downward via a plurality of reactor core support rods 125.

In the inner portion of the reactor vessel main body 101a, a reactor core tank 127 having a cylindrical shape is disposed at a predetermined distance from the inner wall surface, the upper portion of the reactor core tank 127 is connected to the upper reactor core plate 126, and the lower portion of the reactor core tank 127 is connected to a lower reactor core plate 128 that is formed in a disk shape and on which a plurality of communication holes (not shown) are formed. In addition, the lower reactor core plate 128 is supported by the lower reactor core support plate 124. That is, the reactor core tank 127 is supported by the lower reactor core support plate 124 of the reactor vessel main body 101a.

The reactor core 129 is formed of the upper reactor core plate 126, the reactor core tank 127, and the lower reactor core plate 128. The plurality of fuel assemblies 120 are disposed inside the reactor core 129. The fuel assembly 120 is configured so that a plurality of fuel rods (not shown) are bundled in a lattice shape by support lattices, an upper nozzle is fixed to the upper end portion, and a lower nozzle is fixed to the lower end portion. In addition, a plurality of control rods 130 are disposed inside the reactor core 129. The upper end portions of the plurality of control rods 130 are collected to form a control rod cluster 131, and the plurality of control rods 130 can be inserted into the fuel assembly 120. A plurality of control rod cluster guide-tubes 132 penetrating the upper reactor core support plate 123 are fixed to the upper reactor core support plate 123, and the lower end portion of each control rod cluster guide-tube 132 extends to the control rod cluster 131 inside the fuel assembly 120.

The upper portion of the reactor vessel cover 101b configuring the reactor vessel 101 is formed in a hemispherical shape and a magnetic jack type control rod driving device 133 is provided on the upper portion, and the control rod driving device 133 is accommodated in a housing 134 that is integrally formed with the reactor vessel cover 101b. The upper end portions of the plurality of control rod cluster guide-tubes 132 extend to the control rod driving device 133, and a control rod cluster driving shaft 135 extending from the control rod driving device 133 extends to the fuel assembly 120 through the control rod cluster guide-tube 132 and can hold the control rod cluster 131.

The control rod driving device 133 extends in the up-down direction and is connected to the control rod cluster 131, and the control rod driving device 133 vertically moves the control rod cluster driving shaft 135, in which a plurality of circumferential grooves are disposed on the surface of the shaft 135 at a uniform pitch in the longitudinal direction, by the magnetic jack, and thus, controls the output of the reactor.

Moreover, in the reactor vessel main body 101a, a plurality of instrumentation tube supports 136 penetrating the lower head 101e are provided, and in each instrumentation tube support 136, an in-core instrumentation guide tube 137 is connected to the upper end portion inside the reactor, and a conduit tube 138 is connected to the lower end portion outside the reactor. The upper end portion of each in-core instrumentation guide tube 137 is connected to the lower reactor core support plate 124, and upper and lower connection plates 139 and 140 are attached to the in-core instrumentation guide tube 137 to prevent vibration. A thimble tube 141, on which a neutron flux detector (not shown) capable of measuring a neutron flux is mounted, penetrates the lower reactor core plate 128 through the instrumentation tube support 136 and the in-core instrumentation guide tube 137 from the conduit tube 138, and can be inserted into the fuel assembly 120.

Accordingly, the control rod cluster driving shaft 135 is moved by the control rod driving device 133 so that the control rod 130 is extracted from the fuel assembly 120 by a predetermined amount, nuclear fission in the reactor core 129 is controlled, the light water filling the reactor vessel 101 is heated by the generated heat energy, the high-temperature light water is discharged from the outlet side tube support 101d, and as described above, the high-temperature light water is fed to the steam generator 103. That is, neutrons are emitted by the nuclear fission of nuclear fuels configuring the fuel assembly 120, the light water serving as the moderator and the primary cooling water decrease kinetic energy of the emitted high-speed neutrons to generate thermal neutrons, and the light water easily generates new nuclear fission and absorbs the generated heat, and the fuel assembly is cooled. Meanwhile, the control rod 130 is inserted into the fuel assembly 120, and thus, the number of neutrons generated in the reactor core 129 is adjusted, and all control rods 130 are inserted into the fuel assembly 120, and thus, it is possible to urgently stop the reactor.

Moreover, in the reactor vessel 101, an upper plenum 142 that communicates with the outlet side tube support 101d is formed on the upper portion of the reactor core 129, and a lower plenum 143 is formed on the lower portion thereof. In addition, the inlet side tube support 101c and a downcomer portion 144 communicating with the lower plenum 143 are formed between the reactor vessel 101 and the reactor core tank 127. Accordingly, the light water flows into the reactor vessel main body 101a from the inlet side tube support 101c, flows downward along the downcomer portion 144 to reach the lower plenum 143, and rises to be guided upward by the spherical inner surface of the lower plenum 143. In addition, after the light water passes through the lower reactor core support plate 124 and the lower reactor core plate 128, the light water flows into the reactor core 129. The light water flowing into the reactor core 129 absorbs the heat energy generated from the fuel assembly 120 configuring the reactor core 129, and thus, the light water cools the fuel assembly 120 to reach a high temperature, passes through the upper reactor core plate 126, rises up to the upper plenum 142, and is discharged through the outlet side tube support 101d.

In the reactor vessel 101 configured as above, as shown in FIG. 3, the instrumentation tube support 136 is configured so that an in-core instrumentation tube 145 is fitted into a mounting hole 146 formed on the lower head 101e of the reactor vessel main body 101a, and is fixed to the inner surface of the lower head 101e by welding (groove welded section 147). In the reactor vessel main body 101a, stainless steel is build-up welded to the inner surface of a low alloy steel which is a base material, and in a state where the in-core instrumentation tube 145 made of a nickel-based alloy is fitted to the mounting hole 146 of the reactor vessel main body 101a, the in-core instrumentation tube 145 is welded to the reactor vessel main body 101a (by the groove welded section 147) with the material made of a nickel-based alloy.

Accordingly, tensile stress may remain on the instrumentation tube support 136 (the in-core instrumentation tube 145), and the groove welded section 147 and the periphery of the groove welded section, and thus, probability of occurrence of stress corrosion cracking due to long-time use becomes higher. Therefore, by a water jet peening device serving as a reactor repair device, tensile residual stress on the surface of the instrumentation tube support 136 (in-core instrumentation tube 145) to be repaired or the surface (inner surface) of the lower head 101e which is the groove welded section 147 and the periphery of the groove welded section is improved so as to be compression residual stress, and thus, the stress corrosion cracking is prevented. The water jet peening device sprays high-pressure water including cavitation bubbles on the surface of a metal member in water, and thus, the tensile residual stress on the surface of the metal member is improved so as to be the compression residual stress.

Moreover, when the tensile residual stress on the surface of the in-core instrumentation tube 145 or the surface of the lower head 101e is improved so as to be the compression residual stress by the water jet peening device, the water jet peening device is mounted on the instrumentation tube support 136 (in-core instrumentation tube 145) and the work is performed.

Figure 4:
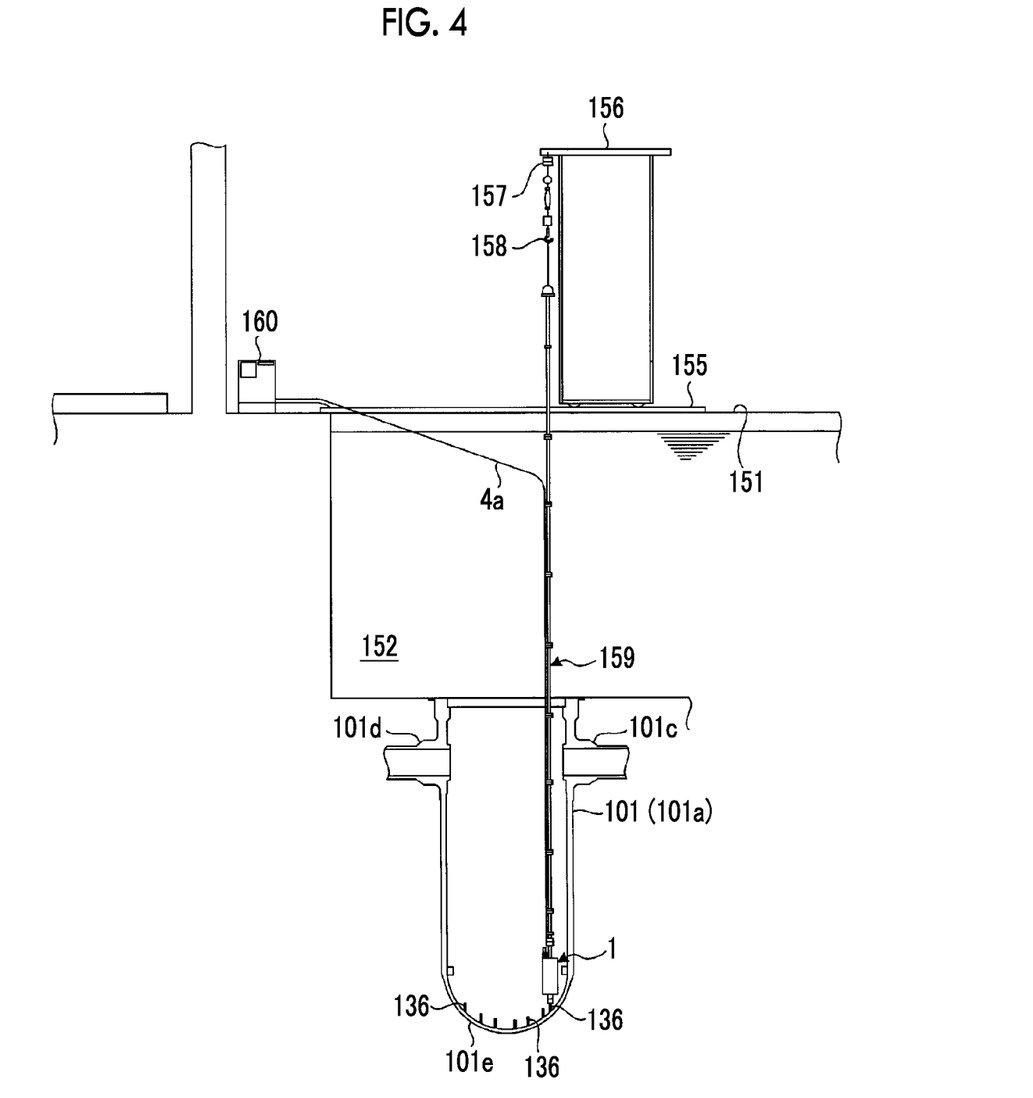
FIG. 4 is a schematic view showing an installation state of a water jet peening device.
Figure 5:
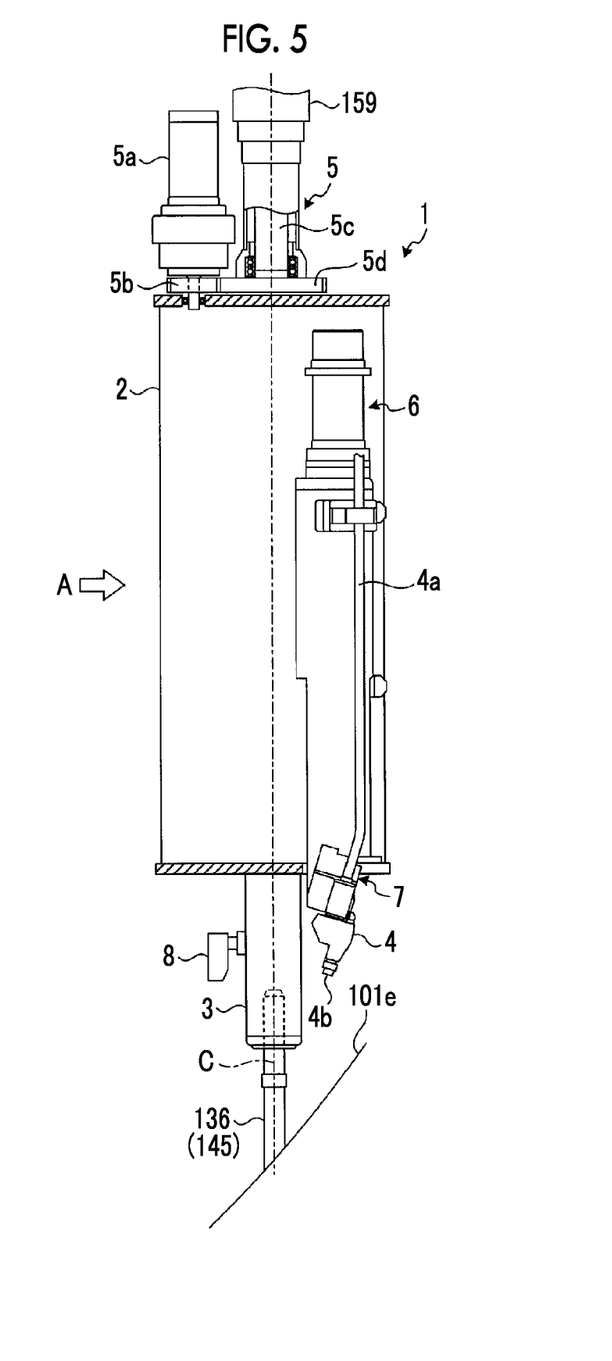
FIG. 5 is a front view of the water jet peening device.
Figure 6:
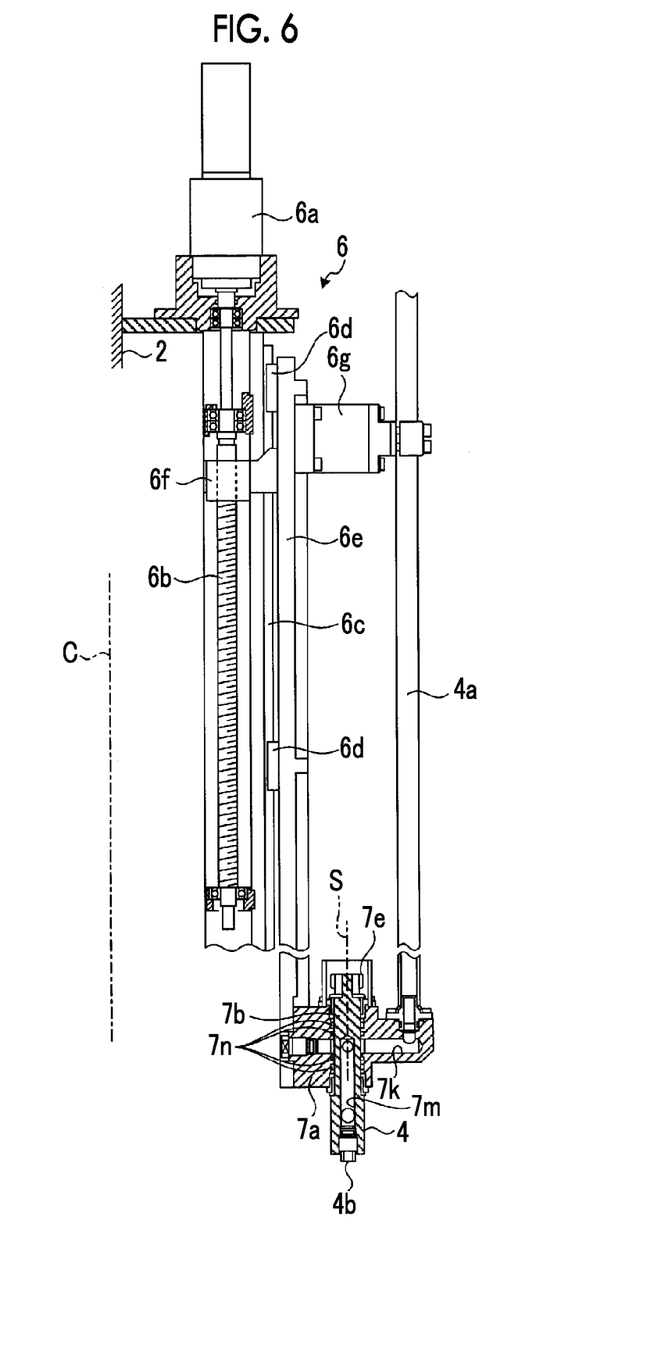
FIG. 6 is a side view showing a lifting mechanism of the water jet peening device.
Figure 7:
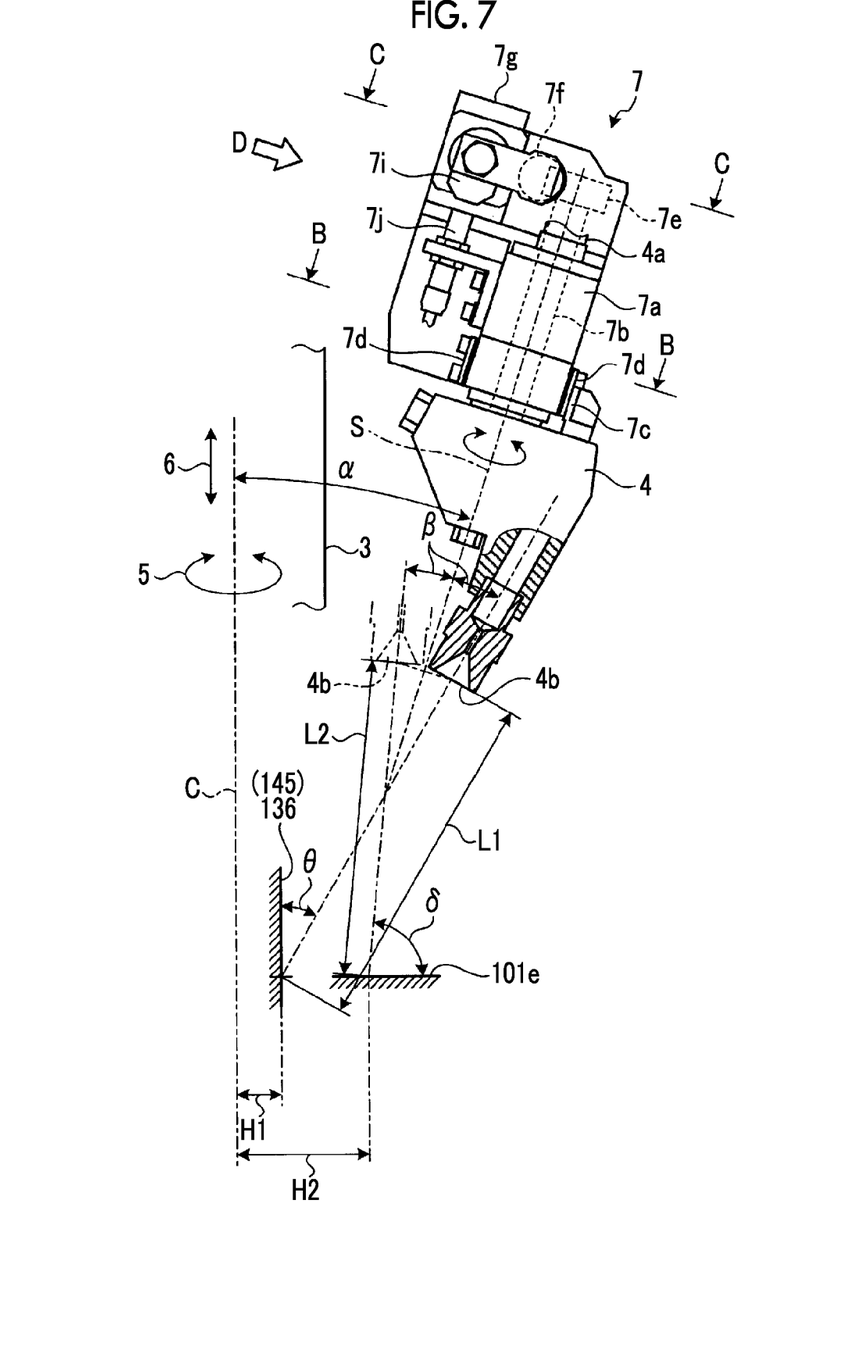
FIG. 7 is a front view showing a spray nozzle of the water jet peening device.
Figure 8:
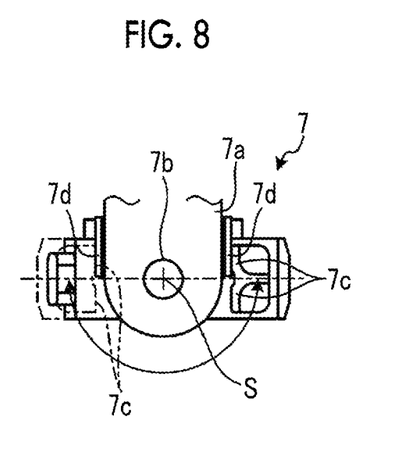
FIG. 8 is a plan cross-sectional view showing a rotation mechanism of the water jet peening device.
Figure 9:
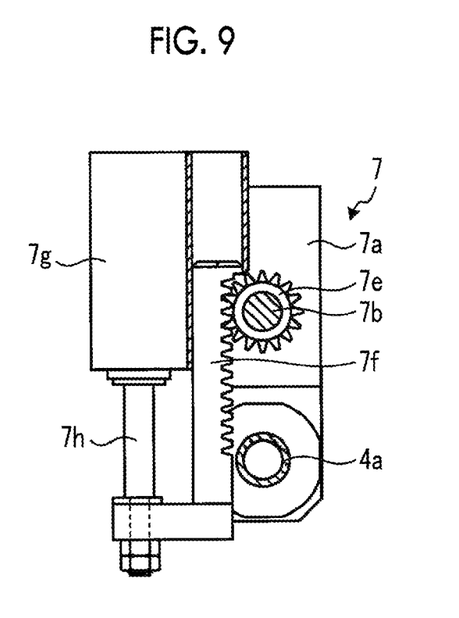
FIG. 9 is a plane cross-sectional view showing the rotation mechanism of the water jet peening device.
Figure 10:
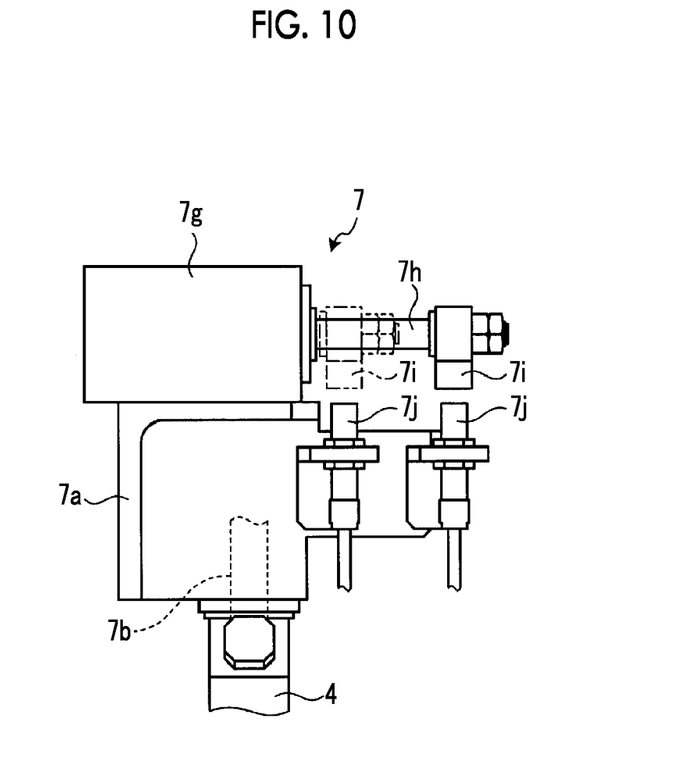
FIG. 10 is a side view showing the rotation mechanism of the water jet peening device.

FIG. 4 is a schematic view showing the installation state of the water jet peening device, FIG. 5 is a front view of the water jet peening device, FIG. 6 is a side view (when viewed from arrow A of FIG. 5) showing a lifting mechanism of the water jet peening device, FIG. 7 is a front view showing a spray nozzle of the water jet peening device, FIG. 8 is a plane cross-sectional view (cross-sectional view taken along B-B of FIG. 7) showing a rotation mechanism of the water jet peening device, FIG. 9 is a plane cross-sectional view (cross-sectional view taken along C-C of FIG. 7) showing the rotation mechanism of the water jet peening device, and FIG. 10 is a side view (when viewed from arrow D of FIG. 7) showing the rotation mechanism of the water jet peening device.

As shown in FIG. 4, a water jet peening device 1 is fixed to the instrumentation tube support 136 (in-core instrumentation tube 145) provided on the lower head 101e of the reactor vessel 101 (reactor vessel main body 101a).

Moreover, in the nuclear power plant, a work floor 151 is provided on a reactor building (not shown), a cavity 152 is provided below the work floor 151, and cooling water is stored in the cavity 152. The reactor vessel 101 is disposed inside the cavity 152, and the reactor vessel 101 is supported in a suspended manner. In the reactor building, a pair of parallel guide rails 155 is provided on both sides of the cavity 152, and a mobile crane 156 is movably supported by the rails 155. The mobile crane 156 is movable in one direction (right-left direction in FIG. 4) in the horizontal direction, and an electric hoist 157 that is movable in the other direction (a direction orthogonal to the paper surface in FIG. 4) intersecting (orthogonal to) the one direction in the horizontal direction is provided in the mobile crane 156. In addition, the electric hoist 157 includes a hook 158 which can be lifted and lowered in the vertical direction. An installation pole 159 is suspended via the hook 158.

The installation pole 159 is a long member and has a predetermined length, and the water jet peening device 1 can be connected to the lower end portion of the installation pole 159. The installation pole 159 is configured of a plurality of division poles, and the flanges of the upper ends and the lower ends of the division poles come into close contact with each other, and it is possible to fasten the upper ends and the lower ends by a plurality of swing bolts.

As shown in FIG. 5, the water jet peening device 1 includes a device main body 2, a positioning member 3, and a spray nozzle 4. The positioning member 3 is disposed to protrude downward from the lower portion of the device main body 2 and is fitted so as to clamp the upper end of the instrumentation tube support 136 (in-core instrumentation tube 145), and thus, the device main body 2 is fixed to the instrumentation tube support 136.

As shown in FIG. 5, the spray nozzle 4 is provided in the device main body 2, and sprays the high-pressure water on the outer surface of the instrumentation tube support 136 (in-core instrumentation tube 145), the inner surface of the lower head 101e, and the groove welded section 147. A high-pressure water supply tube 4a to which the high-pressure water is supplied is connected to the spray nozzle 4. As shown in FIG. 4, the high-pressure water supply tube 4a is connected to a high-pressure water pump 160 that is installed on the work floor 151 and feeds the high-pressure water. Moreover, a spray port 4b is provided on the lower end portion of the spray nozzle 4. The spray nozzle 4 is provided so as to be movable by a swiveling mechanism 5, a lift mechanism 6, and a rotation mechanism 7 which are three movement mechanisms.

The swiveling mechanism 5 swivels the spray nozzle 4 in the horizontal direction centered on the positioning member 3. The positioning member 3 is fitted to clamp the upper end of the instrumentation tube support 136 (in-core instrumentation tube 145), and thus, the center of the swiveling of the swiveling mechanism 5 is coincident with a central axis C of the instrumentation tube support 136 (in-core instrumentation tube 145). That is, when the positioning member 3 is fitted to clamp the upper end of the instrumentation tube support 136 (in-core instrumentation tube 145), the swiveling mechanism 5 swivels the spray nozzle 4 centered on the central axis C of the instrumentation tube support 136 (in-core instrumentation tube 145).

As shown in FIG. 5, the swiveling mechanism 5 includes a swiveling motor 5a above the device main body 2. A driving gear 5b is provided on the output shaft of the swiveling motor 5a. In addition, the swiveling mechanism 5 includes a swivel shaft 5c above the device main body 2. The swivel shaft 5c is provided parallel to the output shaft of the swiveling motor 5a, is connected to the upper portion of the device main body 2, and is rotatably provided with respect to the installation pole 159. Moreover, a driven gear 5d that meshes with the driving gear 5b of the swiveling motor 5a is provided on the swivel shaft 5c. The rotation center of the swivel shaft 5c and the rotation center of the driven gear 5d are coincident with each other centered on the positioning member 3. In addition, when the swiveling motor 5a is driven, the rotation is transmitted from the driving gear 5b to the driven gear 5d, and the swivel shaft 5c is rotated centered on the positioning member 3 which accompanies the device main body 2. Accordingly, the spray nozzle 4 provided in the device main body 2 is swiveled centered on the positioning member 3. That is, when the positioning member 3 is fitted to clamp the upper end of the instrumentation tube support 136 (in-core instrumentation tube 145), the spray nozzle 4 is swiveled centered on the instrumentation tube support 136 (in-core instrumentation tube 145).

The lift mechanism 6 raises and lowers the spray nozzle 4 in the vertical direction with respect to the positioning member 3. The positioning member 3 is fitted to clamp the upper end of the instrumentation tube support 136 (in-core instrumentation tube 145), and thus, the device main body 2 is fixed to the instrumentation tube support 136. That is, when the positioning member 3 is fitted to clamp the upper end of the instrumentation tube support 136 (in-core instrumentation tube 145), the lift mechanism 6 lifts and lowers the spray nozzle 4 so that the spray nozzle 4 approaches or moves away from the instrumentation tube support 136 (in-core instrumentation tube 145), the inner surface of the lower head 101e, and the groove welded section 147.

As shown in FIG. 6, the lift mechanism 6 includes a lifting motor 6a that is fixed to the device main body 2. A ball screw 6b is provided on the output shaft of the lifting motor 6a. The ball screw 6b is provided to extend in the up-down direction, and is rotatably provided with respect to the device main body 2. When the positioning member 3 is fitted to clamp the upper end of the instrumentation tube support 136 (in-core instrumentation tube 145), the ball screw 6b is parallel with the central axis C of the instrumentation tube support 136 (in-core instrumentation tube 145) and extends in the vertical direction. In addition, the lift mechanism 6 includes a rail 6c that is provided to extend parallel to the ball screw 6b and is fixed to the device main body 2. A slider 6d that is movable in the extension direction of the rail 6c is provided on the rail 6c. A slide frame 6e is fixed to the slider 6d. Moreover, a nut portion 6f that is screwed to the ball screw 6b is fixed to the slide frame 6e. In addition, the spray nozzle 4 is fixed to the slide frame 6e. The high-pressure water supply tube 4a that is connected to the spray nozzle 4 is supported by the slide frame 6e via the support portion 6g. When the lifting motor 6a is driven, the ball screw 6b is rotated, and the nut portion 6f is slidably moved along the extension direction of the rail 6c which accompanies the slide frame 6e by the rotation. That is, when the positioning member 3 is fitted to clamp the upper end of the instrumentation tube support 136 (in-core instrumentation tube 145), the spray nozzle 4 is lifted and lowered along the extension direction of the central axis C of the instrumentation tube support 136 (in-core instrumentation tube 145).

The rotation mechanism 7 rotates the spray nozzle 4. Specifically, as shown in FIG. 7, when the positioning member 3 is fitted to clamp the upper end of the instrumentation tube support 136 (in-core instrumentation tube 145), the rotation mechanism 7 rotates the spray nozzle 4 centered on a rotation shaft center S that is inclined at a predetermined angle α (for example, 17.5°) with respect to the vertical direction along the central axis C of the instrumentation tube support 136 (in-core instrumentation tube 145).

The rotation mechanism 7 is attached to the device main body 2, and includes a rotation shaft 7b extending along the rotation shaft center S on a base portion 7a fixed to the device main body 2. The rotation shaft 7b is rotatably provided with respect to the base portion 7a, the spray nozzle 4 is attached to the rotation shaft 7b, and the rotation shaft 7b is rotated centered on the rotation shaft center S accompanied by the spray nozzle 4.

Moreover, the rotation mechanism 7 includes restricting means for restricting the spray nozzle 4 so that the rotational movement of the spray nozzle 4 is reversed at 180°. As shown in FIGS. 7 and 8, the restricting means includes an abutting portion 7c that is provided on the spray nozzle 4 which is the movement side, and a stopper 7d that is provided on the base portion 7a of the rotation mechanism 7 which is the fixed side. The stoppers 7d are disposed so that positions are displaced at 180° centered on the rotation shaft center S. In addition, the abutting portion 7c abuts the stopper 7d according to the rotational movement of the spray nozzle 4, and thus, the rotational movement of the spray nozzle 4 is restricted to be reversed at 180°.

In addition, as shown in FIG. 9, in order to rotate the spray nozzle 4 centered on the rotation shaft center S, the rotation mechanism 7 includes a pinion gear 7e that is provided on the rotation shaft 7b. The pinion gear 7e meshes with the rack gear 7f. The rack gear 7f is provided so as to slidingly move with respect to the base portion 7a, and rotates the pinion gear 7e which accompanies the rotation shaft 7b by the sliding movement. The rack gear 7f is connected to a cylinder rod 7h of a cylinder 7g and slidingly moves accompanied by sliding of the cylinder rod 7h. That is, when the cylinder 7g is driven, the rack gear 7f slidingly moves, the rotation shaft 7b is rotated accompanied by the rotation of the pinion gear 7e, and the spray nozzle 4 is rotated centered on the rotation shaft center S. In addition, a slide moving range (a rotational movement range of the rotation shaft 7b) of the rack gear 7f moved by the cylinder 7g is set so as to be greater than the rotational movement range of the spray nozzle 4 which is restricted by the above-described restricting means (the abutting portion 7c and the stopper 7d).

In addition, in the rotation mechanism 7, a magnet 7i is provided on the connection portion between the cylinder rod 7h of the cylinder 7g and the rack gear 7f. The magnet 7i slidingly moves along with the slide movement of the rack gear 7f moved by the cylinder 7g. Magnetic detection sensors 7j for detecting the magnetism of the magnet 7i are provided on both end portions in the slide movement of the magnet 7i. The position of each magnetic detection sensor 7j corresponds to the slide moving range of the rack gear 7f in the rotational movement range of the spray nozzle 4 restricted by the above-described restricting means (abutting portion 7c and stopper 7d). Accordingly, the slide position of the rack gear 7f at which the magnetism of the magnet 7i is detected by each magnetic detection sensor 7j becomes the rotation position of the spray nozzle 4 restricted by the restricting means (abutting portion 7c and stopper 7d), and this rotation position is detected.

In addition, as shown in FIG. 6, in the rotation mechanism 7, the rotation shaft 7b is supported so as to be rotated with respect to the base portion 7a, and the spray nozzle 4 is provided so as to be rotated. Moreover, an introduction path 7k that introduces the high-pressure water supplied from the high-pressure water supply tube 4a is provided in the inner portion of the base portion 7a. Meanwhile, a communication path 7m through which the introduction path 7k and the spray port 4b communicate with each other is provided in the inner portion of the rotation shaft 7b. Moreover, in the portion of the base portion 7a at which the rotation shaft 7b is supported so as to rotate, a sealing material 7n which seals the communication portion between the introduction path 7k and the communication path 7m is provided. That is, the high-pressure water supplied from the high-pressure water supply tube 4a is introduced into the introduction path 7k, and is sprayed from the spray port 4b via the communication path 7m. Moreover, the spray nozzle 4 rotates centered on the rotation shaft center S (rotation shaft 7b). Moreover, the introduction path 7k is provided on the base portion 7a which is the fixed side, the communication path 7m is provided on the rotation shaft 7b which is the rotating side, but the mutual communication portion is sealed by the sealing material 7n. Accordingly, the high-pressure water supply tube 4a supplying the high-pressure water can be connected to the introduction path 7k provided in the base portion 7a which is the fixed side, torsion does not occur in the high-pressure water supply tube 4a when the spray nozzle 4 is rotated, and the high-pressure water can be sprayed from the spray port 4b without being leaked outside the rotation shaft 7b by the sealing material 7n. That is, the rotation mechanism 7 rotatably supports the spray nozzle 4 by a so-called swivel joint.

In the spray nozzle 4 that is attached to the rotation shaft 7b, the spray port 4b is provided toward the rotation shaft center S side in the direction that is inclined with respect to the rotation shaft center S. Specifically, as shown in FIG. 7, in each reversed position at which the rotational movement is restricted at 180° by the restricting means (abutting portion 7c and stopper 7d), the spray port 4b is provided toward the rotation shaft center S side in the direction that is inclined at a predetermined angle β (for example, 12.5°) with respect to the rotation shaft center S. That is, the high-pressure water is sprayed in this direction.

For example, when the positioning member 3 is fitted to clamp the upper end of the instrumentation tube support 136 (in-core instrumentation tube 145), since the spray port 4b shown by a solid line in FIG. 7 is inclined at a predetermined angle β (for example, 12.5°) outside (the side away from the central axis C) the rotation shaft center S with respect to the rotation shaft center S inclined at a predetermined angle α (for example, 17.5°) to the central axis C, the high-pressure water is sprayed obliquely downward from above at an angle θ (for example, 30°) of the predetermined angle α+the predetermined angle β with respect to the surface which is vertical along the central axis C. This angle is within a range of 30° to 90° which is the spray angle of the high-pressure water suitable for the water jet peening. That is, it is possible to spray the high-pressure water on the outer surface of the instrumentation tube support 136 (in-core instrumentation tube 145) that is vertically provided along the central axis C, or on the inner surface nearly vertical with respect to the hemispherical lower head 101e to the inner surface that is inclined 60° or more with respect to the vertical surface, for example, at a suitable angle.

Meanwhile, when the positioning member 3 is fitted to clamp the upper end of the instrumentation tube support 136 (in-core instrumentation tube 145), since the spray port 4b shown by a two-dot chain line in FIG. 7 is inclined at the predetermined angle (for example, 12.5°) inside (the side close to the central axis C) the rotation shaft center S with respect to the rotation shaft center S inclined at the predetermined angle α (for example, 17.5°) to the central axis C, the high-pressure water is sprayed downward from above at an angle δ (for example, 85°) with respect to the horizontal surface orthogonal to the central axis C at the angle of the predetermined angle α—the predetermined angle β. This angle is within a range of 30° to 90° which is the spray angle of the high-pressure water suitable for the water jet peening. That is, it is possible to spray the high-pressure water on the horizontal inner surface in the hemispherical lower head 101e to the inner surface that is inclined 55° or more with respect to the horizontal surface, for example, at a suitable angle.

In addition, when the positioning member 3 is fitted to clamp the upper end of the instrumentation tube support 136 (in-core instrumentation tube 145), in the spray port 4b of the spray nozzle 4, the distance from the central axis C at each reversed position to the spray position in the horizontal direction is appropriately set. Specifically, in FIG. 7, a distance H1 in the horizontal direction from the central axis C to the spray position on the outer surface of the instrumentation tube support 136 (in-core instrumentation tube 145), or a distance H2 in the horizontal direction from the central axis C to the spray position on the inner surface of the lower head 101e is determined by the design value of each instrumentation tube support 136, and the design value is commonly used for all instrumentation tube supports 136. Accordingly, the position of the spray port 4b of the spray nozzle 4 is set so that the distances H1 and H2 are set. In the water jet peening device 1 of the present embodiment, in the rotation mechanism 7, when the positioning member 3 is fitted to clamp the upper end of the instrumentation tube support 136 (in-core instrumentation tube 145), as shown in FIG. 7, the spray nozzle 4 is supported so as to rotate centered on the rotation shaft center S which is downwardly inclined to the instrumentation tube support 136 side (positioning member 3 side) in the vertical direction, and the spray port 4b is disposed toward the rotation shaft center S side in the direction that is inclined with respect to the rotation shaft center S. Accordingly, when the spray nozzle 4 is rotated as shown by the solid line in FIG. 7, the high-pressure water reaches the position of the distance H1 close to the central axis C, and when the spray nozzle 4 is rotated as shown by the two-dot chain line in FIG. 7, the high-pressure water reaches the position of the distance H2 away from the central axis C. In addition, the angle α and the angle β are set so that the relationship between the distances H1 and H2 is coincident with the design value of the instrumentation tube support 136. As a result, it is possible to perform the water jet peening on two locations of the outer surface of the instrumentation tube support 136 (in-core instrumentation tube 145) and the inner surface of the lower head 101e by the rotation of the spray nozzle 4.

In addition, when the positioning member 3 is fitted to clamp the upper end of the instrumentation tube support 136 (in-core instrumentation tube 145), a distance L1 shown by a solid line in FIG. 7 from the spray port 4b to the outer surface of the instrumentation tube support 136 (in-core instrumentation tube 145) or a distance L2 shown by a two-dot chain line in FIG. 7 from the spray port 4b to the inner surface of the lower head 101e is adjusted by the lift mechanism 6. The distances L1 and L2 are set to 130 mm±10 mm, which are the spray distance of the high-pressure water suitable for the water jet peening. In the state where the positioning member 3 is fitted to clamp the upper end of the instrumentation tube support 136 (in-core instrumentation tube 145), since the position in the vertical direction of the spray nozzle 4 is determined by the reference position (for example, the uppermost position) set by the lift mechanism 6 and the design value of each instrumentation tube support 136, after the position of the spray nozzle 4 is determined, it is possible to appropriately adjust the spray distance by the lifting and lowering position of the spray nozzle 4 performed by the lift mechanism 6.

Moreover, as shown in FIG. 5, in the water jet peening device 1, an application monitoring camera 8 is provided on the positioning member 3 which is the device main body 2 side. The application monitoring camera 8 is fixed to the positioning member 3, is provided so as to be swiveled along with the spray nozzle 4 by the swiveling mechanism 5, and can photograph the spray state of the high-pressure water performed by the spray nozzle 4.

Here, a method of applying the water jet peening device 1 with respect to the outer surface of the instrumentation tube support 136 (in-core instrumentation tube 145), and a method of applying the water jet peening with respect to the inner surface of the lower head 101e will be described.

As shown in FIG. 4, in a state where the cooling water is stored in the cavity 152, the water jet peening device 1 is suspended via the installation poles 159 by the mobile crane 156. From here, the water jet peening device 1 is moved in the horizontal direction by the mobile crane 156, and the water jet peening device 1 is lowered by the electric hoist 157 while being positioned with respect to the instrumentation tube support 136.

In addition, as shown in FIG. 5, the positioning member 3 is positioned at the upper end of the instrumentation tube support 136, and thus, the water jet peening device 1 is fixed to the instrumentation tube support 136.

If the water jet peening device 1 is fixed to the instrumentation tube support 136, monitoring is performed by the application monitoring camera 8, the spray nozzle 4 is rotated by the rotation mechanism 7 in accordance with the application with respect to the outer surface of the instrumentation tube support 136 (in-core instrumentation tube 145) and the application with respect to the inner surface of the lower head 101e, the height position of the spray nozzle 4 is adjusted by the lift mechanism 6 while swiveling the spray nozzle 4 by the swiveling mechanism 5 in the state where the high-pressure water is sprayed, and thus, the high-pressure water including the cavitation bubbles is sprayed on the outer surface of the instrumentation tube support 136 (in-core instrumentation tube 145) or the inner surface of the lower head 101e. Accordingly, the tensile residual stress on the outer surface of the instrumentation tube support 136 (in-core instrumentation tube 145) or the inner surface of the lower head 101e is improved so as to be the compression residual stress.

In this way, in the water jet peening device 1 of the present embodiment, there is provided a water jet peening device 1 in which the spray nozzle 4 is provided along with the positioning member 3 positioned at the upper end of the instrumentation tube support 136, and the water jet is sprayed from the spray port 4b of the spray nozzle 4, including: the swiveling mechanism 5 that swivels the spray nozzle 4 in the horizontal direction centered on the positioning member 3 positioned at the upper end of the instrumentation tube support 136; the lift mechanism 6 that raises and lowers the spray nozzle 4 in the vertical direction with respect to the positioning member 3 positioned at the upper end of the instrumentation tube support 136; and the rotation mechanism 7 that supports the spray nozzle 4 so as to be able to rotate centered on the downward-inclined rotation shaft center S on the positioning member 3 side in the vertical direction, disposes the spray port 4b aimed toward the rotation shaft center S side in the direction that is inclined with respect to the rotation shaft center S, and rotates the spray nozzle 4 centered on the rotation shaft center S.

According to the water jet peening device 1, in the rotation mechanism 7, the spray nozzle 4 is supported so as to be able to rotate centered on the downward-inclined rotation shaft center S on the positioning member 3 side in the vertical direction, the spray port 4b is disposed aimed toward the rotation shaft center S side in the direction that is inclined with respect to the rotation shaft center S, and the spray nozzle 4 is rotated centered on the rotation shaft center S. Accordingly, a state where the spray port 4b is disposed in the direction inclined at a predetermined angle from the vertical direction at the position at which the distance in the horizontal direction from the positioning member 3 side is relatively long, and a state where the spray port 4b is disposed in the vertical direction at the position at which the distance in the horizontal direction from the positioning member 3 side is relatively short are obtained. Accordingly, it is possible to adjust the position in the horizontal direction by the rotation mechanism 7. As a result, according to the configurations of the swiveling mechanism 5, the lift mechanism 6, and the rotation mechanism 7, it is possible to perform the water jet peening on the outer surface of the instrumentation tube support 136 and the groove welded section 147 (the inner surface of the lower head 101e) of the instrumentation tube support 136 while preventing an increased size and complexity of the device.

In addition, in the water jet peening device 1 of the present invention, the rotation mechanism 7 includes: the rotation shaft 7b that supports the spray nozzle 4 so as to be able to rotate with respect to a base portion 7a of the rotation shaft; the introduction path 7k that is provided in the inner portion of the base portion 7a and introduces the high-pressure water; the communication path 7m that is provided in the inner portion of the rotation shaft 7b and causes the introduction path 7k and the spray port 4b to communicate with each other; and the sealing material 7n that seals the communication portion between the communication path 7m and the introduction path 7k while allowing the rotation of the rotation shaft 7b.

According to the water jet peening device 1, it is possible to connect the high-pressure water supply tube 4a that supplies the high-pressure water to the introduction path 7k provided in the base portion 7a which is the fixed side, and it is possible to spray the high-pressure water from the spray port 4b while preventing torsion in the high-pressure water supply tube 4a from being generated when the spray nozzle 4 is rotated and preventing the high-pressure water from being leaked outside the rotation shaft 7b by the sealing material 7n.

In addition, in the water jet peening device 1 of the present embodiment, the rotation mechanism 7 includes: the pinion gear 7e that is provided in the spray nozzle 4 centered on the rotation shaft center S; the rack gear 7f that meshes with the pinion gear 7e; and the cylinder 7g that slidingly moves the rack gear 7f.

Since the application of the water jet peening is performed in water, if a motor or the like is used in the rotation mechanism 7, a mechanism or the like having a waterproof function is required, and thus, the increase in the size of the rotation mechanism 7 occurs. Meanwhile, according to the water jet peening device 1 of the present embodiment, since the rack gear 7f is slidingly moved by the cylinder 7g and the pinion gear 7e is rotated accompanied by the spray nozzle 4, the waterproof function is not required, and it is possible to prevent the increase in the size of the rotation mechanism 7.

In addition, the water jet peening device 1 of the present embodiment includes the restricting means (abutting portion 7c and stopper 7d) for restricting the rotation of the spray nozzle 4 at both positions at which the direction of the spray port 4b is reversed according to the rotation of the spray nozzle 4.

According to the water jet peening device 1, since the restricting means (abutting portion 7c and stopper 7d) is provided, in the configuration in which the rack gear 7f is slidingly moved by the cylinder 7g and the pinion gear 7e is rotated accompanied by the spray nozzle 4, both positions at which the direction of the spray port 4b is reversed are restricted, and thus, it is possible to move the spray port 4b toward the appropriate position.

REFERENCE SIGNS LIST

1: WATER JET PEENING DEVICE
2: DEVICE MAIN BODY
3: POSITIONING MEMBER
4: SPRAY NOZZLE
4a: HIGH-PRESSURE WATER SUPPLY TUBE
4b: SPRAY PORT
5: SWIVELING MECHANISM
5a: SWIVELING MOTOR
5b: DRIVING GEAR
5c: SWIVEL AXIS
5d: DRIVEN GEAR
6: LIFT MECHANISM
6a: LIFTING MOTOR
6b: BALL SCREW
6c: RAIL
6d: SLIDER
6e: SLIDE FRAME
6f: NUT PORTION
6g: SUPPORT PORTION
7: ROTATION MECHANISM
7a: BASE PORTION
7b: ROTATION SHAFT
7c: ABUTTING PORTION (RESTRICTING MEANS)
7d: STOPPER (RESTRICTING MEANS)

7e: PINION GEAR
7f: RACK GEAR
7g: CYLINDER
7h: CYLINDER ROD
7i: MAGNET
7j: MAGNETIC DETECTION SENSOR
7k: INTRODUCTION PATH
7m: COMMUNICATION PATH
7n: SEALING MATERIAL
8: APPLICATION MONITORING CAMERA
101: REACTOR VESSEL
101a: REACTOR VESSEL MAIN BODY
101e: LOWER HEAD
136: INSTRUMENTATION TUBE SUPPORT
145: IN-CORE INSTRUMENTATION TUBE

The invention claimed is:

1. A water jet peening device, comprising:
a spray nozzle provided along with a positioning member positioned at an upper end of an instrumentation tube support, and includes a spray port to spray water jet;
a swiveling mechanism that swivels the spray nozzle around a central axis of the instrumentation tube support, said central axis passing through the center of the positioning member, said positioning member positioned at the upper end of the instrumentation tube support;
a lift mechanism that raises and lowers the spray nozzle in a vertical direction with respect to the positioning member positioned at the upper end of the instrumentation tube support;
a water supply tube including an end portion, where the end portion is bent toward the central axis at a first angle with respect to the central axis; and
a rotation mechanism that supports the spray nozzle, the spray nozzle configured to be rotated by the rotation mechanism while centered on a rotation shaft center located adjacent to the end portion,
wherein the rotation mechanism is disposed at the end portion, and
wherein the spray nozzle is disposed on the rotation mechanism and includes a spray port, and
wherein the spray port is offset from the rotation shaft center such that the spray port rotates eccentrically about the rotation shaft center, wherein the spray port is inclined toward the rotation shaft center at a second angle with respect to the rotation shaft center, and
wherein the rotation mechanism includes
a pinion gear provided concentrically on the rotation shaft center,
a rack gear that meshes with the pinion gear, and
a cylinder that is connected to the rack gear and actuates the rack gear.

2. The water jet peening device according to claim 1, wherein the rotation mechanism includes:
a rotation shaft that supports the spray nozzle, the spray nozzle configured to rotate with respect to a base portion of the rotation shaft;
a water introduction path provided in the inner portion of the base portion;
a communication path that is provided in the inner portion of the rotation shaft, where the communication path causes the introduction path and the spray port to communicate with each other; and
a sealing material that seals a communication portion between the communication path and the introduction path, the sealing material allowing rotation of the rotation shaft.

3. The water jet peening device according to claim 1, further comprising:
a stopper for restricting the rotation of the spray nozzle to a first and second position, wherein said first and second positions are 180 degrees apart.

* * * * *